United States Patent [19]
Culbertson

[11] 3,841,453
[45] Oct. 15, 1974

[54] FRICTION COUPLINGS WITH SPRING CUSHIONED OPERATORS

[75] Inventor: George W. Culbertson, Oconomowoc, Wis.

[73] Assignee: FMC Corporation, San Jose, Calif.

[22] Filed: Sept. 8, 1972

[21] Appl. No.: 287,403

[52] U.S. Cl............ 192/109 A, 192/93 A, 192/18 R
[51] Int. Cl.............................................. F16d 67/04
[58] Field of Search.......... 192/109 A, 109 B, 93 A, 192/93 B, 93 C, 111 B

[56] References Cited
UNITED STATES PATENTS

| | | | |
|---|---|---|---|
| 1,306,302 | 6/1919 | Cooper | 192/109 A X |
| 2,244,169 | 6/1941 | Miller | 192/109 A |
| 2,639,015 | 5/1953 | Wolf | 192/109 A X |
| 2,725,963 | 12/1955 | Fletcher et al. | 192/109 A |
| 2,776,031 | 1/1957 | Turnquist et al. | 192/111 B |
| 2,812,046 | 11/1957 | Taylor | 192/109 A |
| 3,127,969 | 4/1964 | Hansen | 192/109 B X |

*Primary Examiner*—Benjamin W. Wyche
*Attorney, Agent, or Firm*—C. E. Tripp

[57] ABSTRACT

The clutch actuating mechanism is of the type arranged to move a rotatable member, such as a pulley that is to be driven, into and out of engagement with an axially fixed power driven rotary clutch disc—and includes a lever mechanism operatively connected to the movable clutch element, and springs that cooperate with the lever to maintain the relative positions of the clutch members.

4 Claims, 13 Drawing Figures

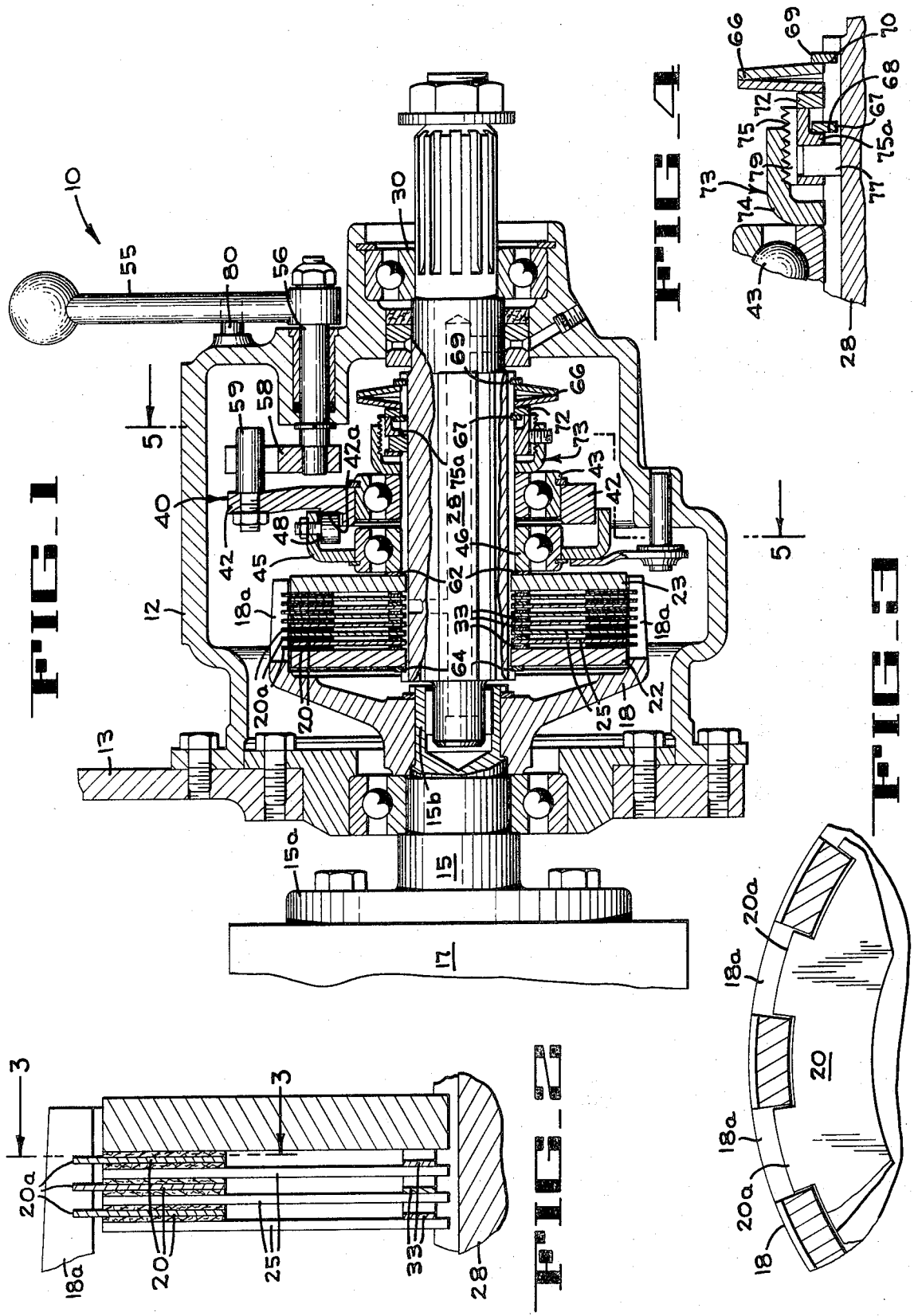

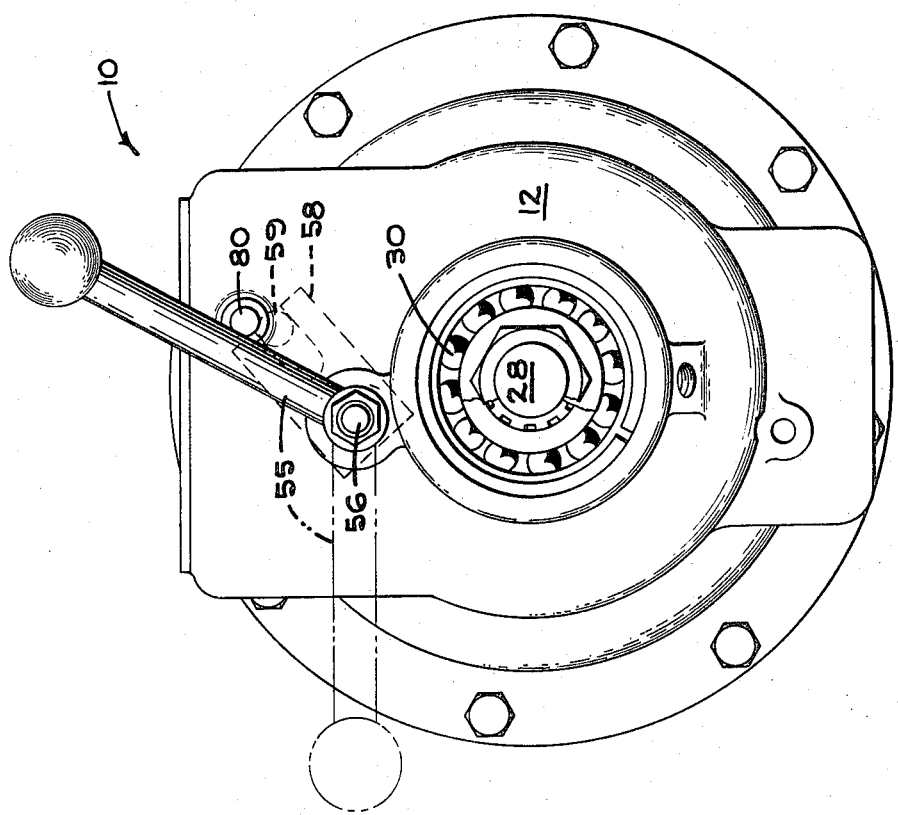
FIG_6
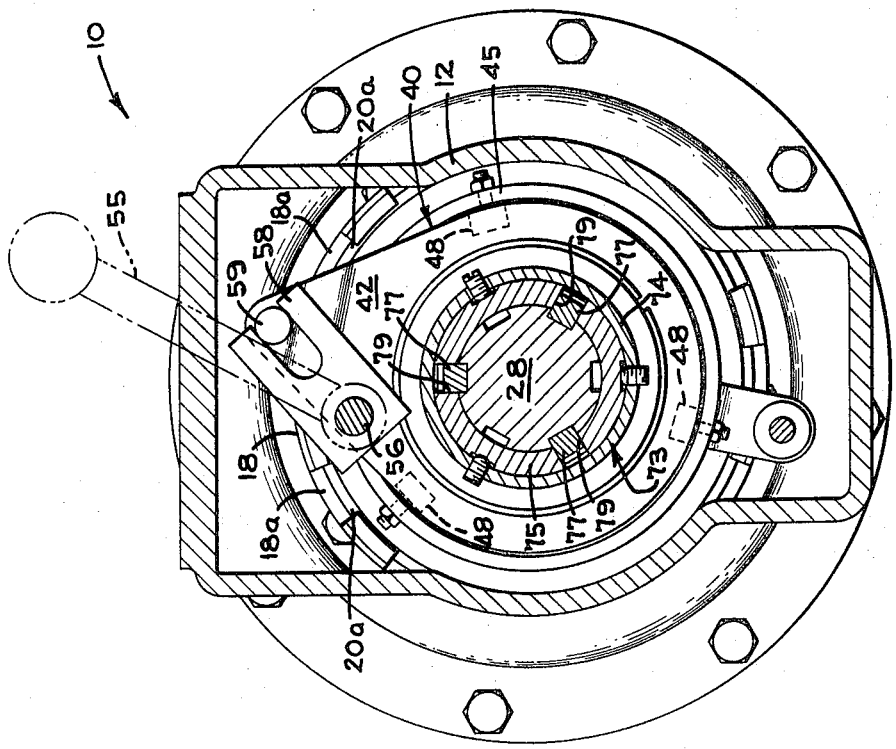
FIG_5

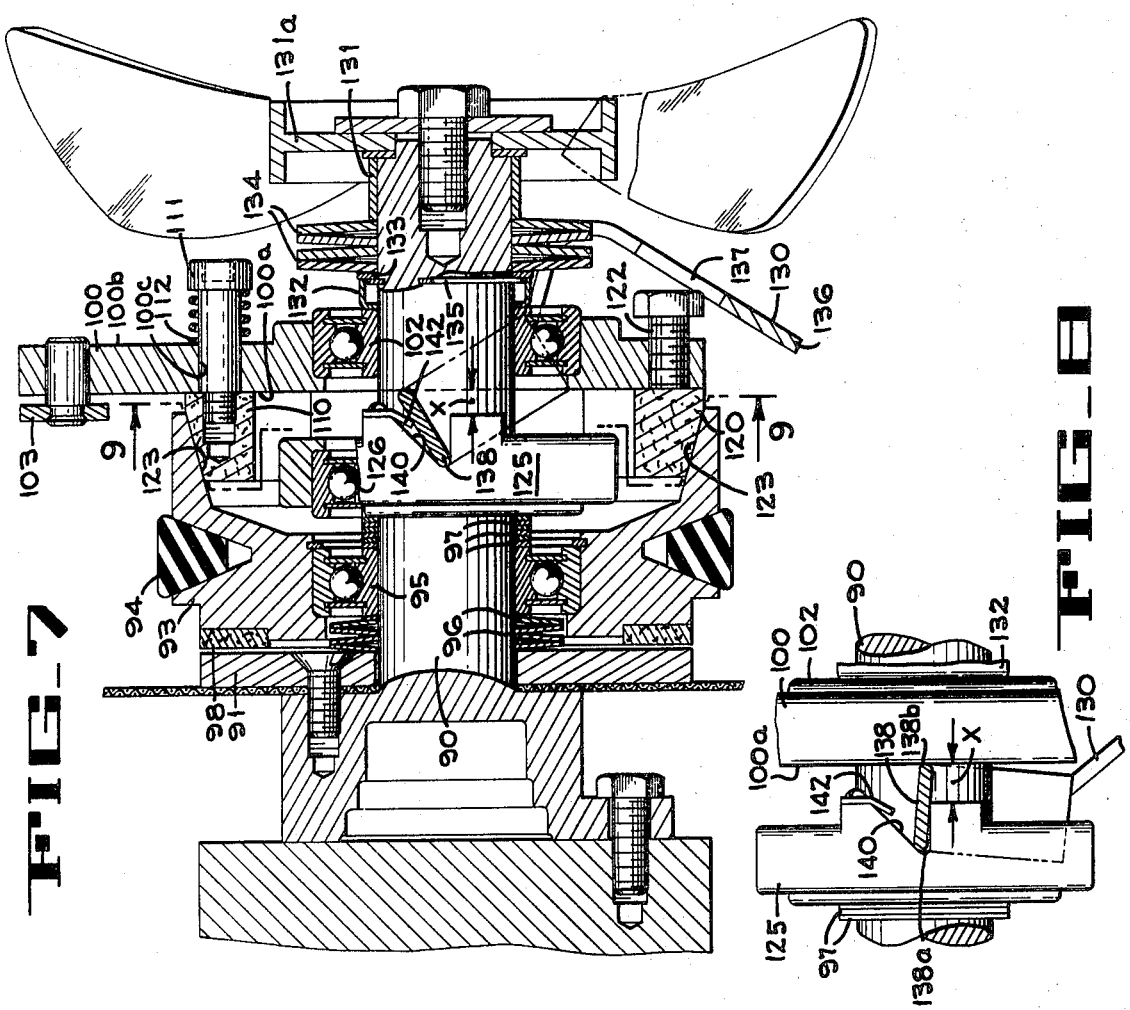

3,841,453

FRICTION COUPLINGS WITH SPRING CUSHIONED OPERATORS

BACKGROUND OF THE INVENTION

Friction clutches of the type with which the actuating mechanism of the present invention is adapted to be used are disclosed in U.S. Pat. Nos. 3,127,969 and 3,474,887. In such clutches, an actuating mechanism is used to effect relative axial movement between a rotary drive member and a rotatable member that is to be driven. The present invention concerns an improved mechanism for effecting the relative movement between the members of a clutch, a brake, or a clutch-brake combination.

It is therefore an object of the present invention to provide an improved actuating mechanism for controlling the engagement and disengagement of rotary elements of clutches and brakes.

SUMMARY OF THE INVENTION

In one preferred embodiment of the invention, the clutch comprises a plurality of friction discs splined to a shaft that is to be driven. These discs are shifted axially by a cam mechanism into engagement with friction rings which are driven due to engagement of projections at their periphery with slots in a power driven drive cup. The cam mechanism acts against the resistance of a spring mechanism which assures that the friction members are urged into engagement under a predetermined amount of pressure. A stop mechanism permits the spring pressure to be withdrawn when the cam mechanism is actuated to release the clutch.

In another preferred embodiment, the actuating mechanism of the present invention includes a lever which is effective to shift a rotatable pulley out of braked engagement with a nonrotatable brake ring and into driven engagement with a power driven disc. A spring resists the movement of the pulley into clutching engagement, and a stop permits the withdrawal of the spring pressure as the pulley is moved out of engagement with the driven disc.

DESCRIPTION OF THE DRAWINGS

FIG. 1 is a longitudinal central section through a clutch having an actuating mechanism constructed in accordance with the teachings of the present invention.

FIG. 2 is an enlarged view of a portion of FIG. 1.

FIG. 3 is a fragmentary transverse section taken along line 3—3 of FIG. 2.

FIG. 4 is an enlarged view of a portion of FIG. 1.

FIG. 5 is a transverse section taken along line 5—5 of FIG. 1.

FIG. 6 is an end elevation of the clutch of FIG. 1.

FIG. 7 is a longitudinal central section, with parts in elevation, of a second embodiment of the clutch actuating mechanism of the present invention.

FIG. 8 is a fragmentary view of a portion of FIG. 7 with parts in a different operating position.

FIG. 9 is a section taken on line 9—9 of FIG. 7.

In FIG. 1, the reference numeral 10 indicates generally a clutch unit which includes a generally cylindrical housing 12 secured to a wall 13. A drive shaft 15, having a flange 15a bolted to an engine flywheel 17, is rotatably journalled in the wall 13 and has a drive cup 18 splined to its end portion 15b. The cup has twelve slots 18a (FIG. 3) spaced equi-distantly around its rim to receive projections 20a of a plurality of friction rings 20 which are disposed between end plates 22 and 23 (FIG. 1), with a friction disc 25 (FIG. 2) disposed between adjacent rings 20. The end plates 22 and 23 and the friction discs have radially inner ends disposed in splined engagement with a driven shaft 28 that is rotatably journalled in the end 15b of shaft 15 and in a bearing unit 30 fixed in the housing 12.

Figure 10:
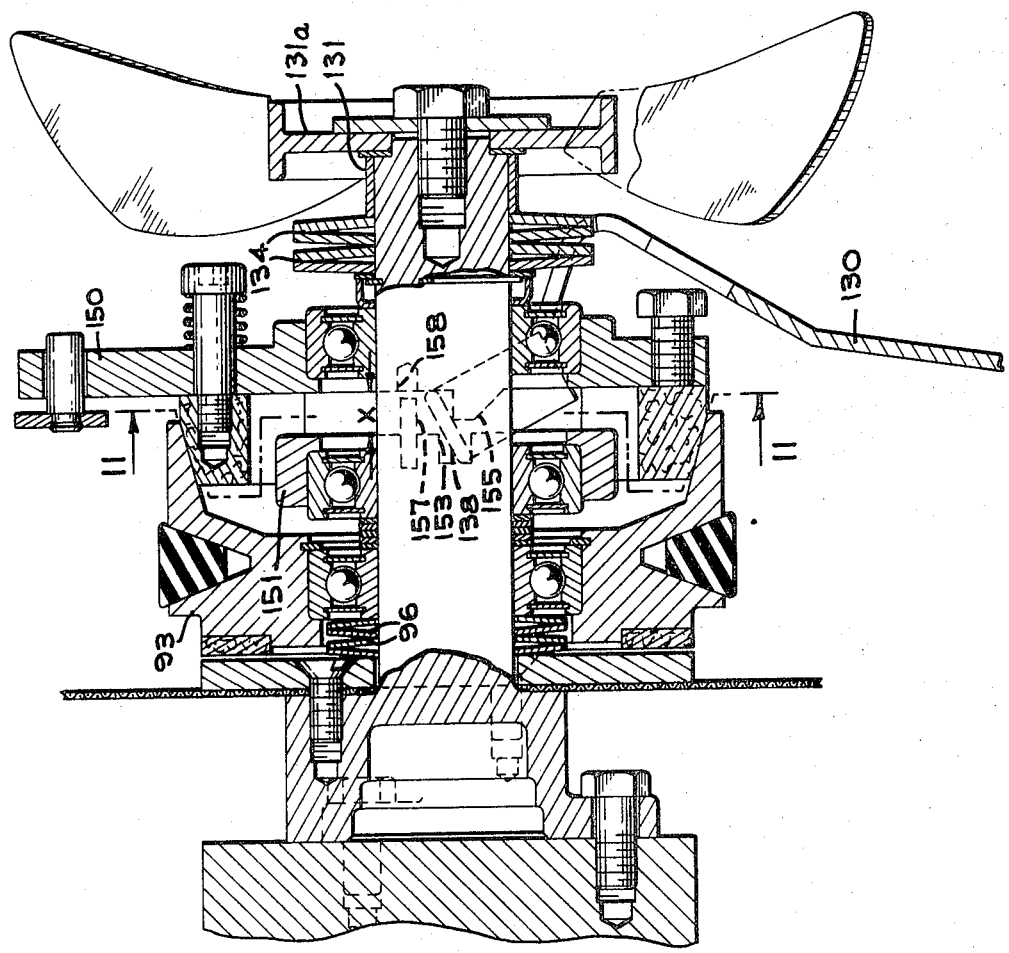
FIG. 10 is a longitudinal central section, with parts in elevation, of a third embodiment of the present invention.
Figure 11:
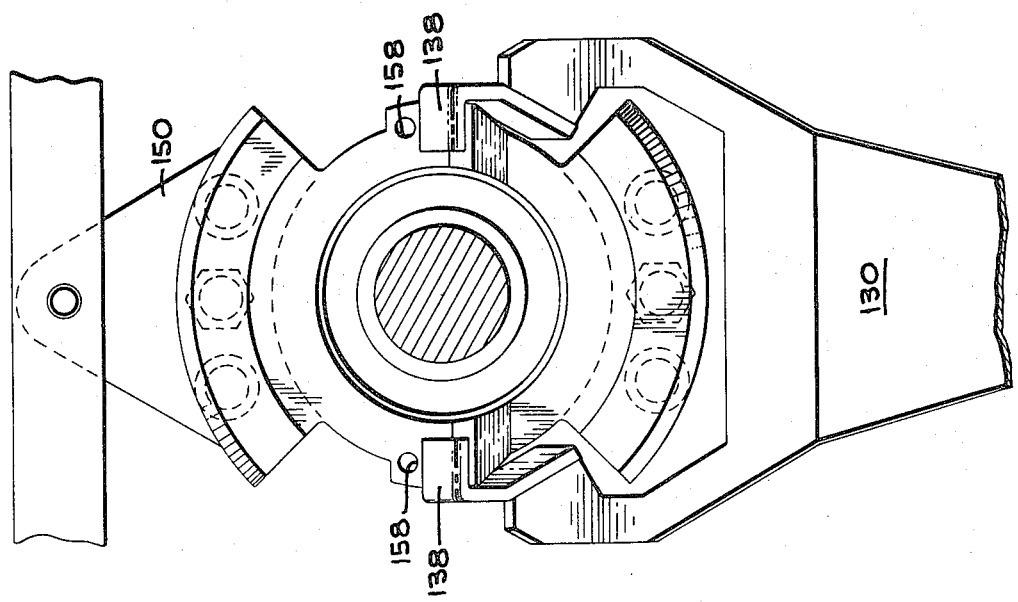
FIG. 11 is a section taken along line 11—11 of FIG. 10.

The friction discs 25 are normally held in spaced relation by Belleville or wave-type spring washers 33 (FIG. 2).

It will be evident that, when the friction rings 20 and the friction disc 25 moved into face-to-face contact, a driving engagement is established between the drive cup 18, and the shaft 28. The free end of shaft 28 is splined to receive a pulley or spocket of a power take-off unit.

The friction discs are moved into contact with the friction rings by means of an actuating mechanism 40 which includes a cam ring 42, fixed to the outer race of a bearing unit 43 slidably carried on shaft 28, and a carrier 45 that is fixed on the outer race of a slidable bearing unit 46 and carries three follower rollers 48 near its periphery. The cam ring 42 has camming surfaces 42a in engagement with the three rollers 48 so that rotation of the cam ring causes axial movement of the carrier 45.

An actuating lever 55, exteriorly of the housing 12, is keyed to a shaft 56 that is journalled in an end wall of the housing and carries, at its inner end, a fork 58 which receives a pin 59 projecting from an upwardly extending portion of the cam ring 42. In FIG. 6 the clutch-out position of lever 55 is shown in solid lines. When the lever is swung 118° in a counterclockwise direction to the phantom-line position, the fork is also swung counterclockwise to cause the cam ring to rotate counterclockwise about its axle.

The camming surfaces on the cam ring are so designed that counterclockwise rotation of the cam ring causes the roller carrier 45 to be moved toward the left (FIG. 1). The inner race of bearing unit 46 engages a spacer washer 62 and forces it to move the end plate 23 toward the left. Accordingly, the entire pack of friction rings and discs are urged toward the left. However, the movement of the end plate 22 is limited by a snap ring 64 that is fixed on shaft 28 against axial movement. Accordingly, the rings and discs become frictionally locked together to establish a drive connection between the drive cup 18 and the shaft 28.

The throw of the cam surfaces is greater than the axial travel of the carrier 45 that is necessary to establish the drive connection. Accordingly, when the carrier cannot move further to the left, the cam ring 42 itself moves toward the right while maintaining contact with the rollers 48. This movement is resisted by a Belleville spring 66 which is disposed between a snap ring 67, that is fixed against axial movement in a transverse slot 68 (FIG. 4) in the splines of shaft 28, and a snap ring 69 in a similar slot 70. Since these rings 67 and 69 are fixed against axial movement, they act as stops for the expansion and contraction of spring 66. The movement of the cam ring to the right is transmitted to the spring 66 by transmission means in the form of a spacer washer 72 and an adjustable pusher unit 73 that includes an internally threaded member 74 and an externally threaded member 75. The members are in threaded engagement and, since the inner member 75 is fixed against rotation by a key 77 that extends through an opening 79 in member 75, rotation of the outer member 74 will cause relative, adjusting movement of members 74 and 75.

It will be noted in FIG. 4 that, as the cam ring 42 moves toward the right, the bearing ring 43 engages the adjustable unit 73 which in turn engages the spacer 72 and partially compressing the spring and moving it away from stop 67. The spring is of a design such that additional compression does not substantially increase its total pressure.

The movement of the adjustable unit 73 to the right, as viewed in FIG. 4, is limited by the stop 67. A shoulder 75a formed in the member 75 contacts the stop 67 and thereby blocks the movement of the cam ring 42, the bearing ring 43 and the adjustable unit 73. Movement of these members to the left is blocked when the spacer 72, which is being urged to the left by the spring 66, comes into contact with the stop 67.

When the lever 55 is rotated clockwise to bring it to the disengaged position of the clutch, the spring 66 expands until spacer 72 engages stop 67. Continued clockwise rotation of lever 55 allows the spring washers 33 to move the disc pack toward the right-separating the discs 25 out of driven relation with the drive ring 20. The stop pin 80 limits the clockwise rotation of lever 55.

Thus, while the large spring 66 assures that the clutch is engaged under substantially uniform pressure, its action during disengagement of the clutch is short-circuited by the stop 67, permitting the smaller springs 33 to release the clutch.

In FIGS. 7, 8 and 9 an embodiment of the actuating mechanism of the present invention is shown in association with a clutch-brake combination.

A shaft 90, that is bolted to a driven member such as a flywheel or the like, has a clutch disc 91 secured thereto. A pulley 93, which receives a belt 94 of a power take-off unit, is carried on a bearing unit 95 that is slidable on shaft 90 between Belleville springs 96 and spacer washers 97 that are also slidable on a shaft 90. An annulus 98 of friction material is secured in a recessed portion of the surface of the pulley facing the clutch disc, A brake plate 100 is carried on the outer race of a bearing unit 102, and is fixed at its upper end against rotation by being secured to a bracket 103 connected to a fixed structure. A shoe 110 of brake material is carried on one face 100a of brake plate 100 by two slide pins 111 (one only being shown in FIG. 7) that are slidable in openings 100c in the member 100. A compression spring 112, disposed between a head portion of each pin and the face 100b of the plate 100, urges the pin in a direction to move the shoe 110 against the face 100a of the plate. A stop screw 115 (FIG. 9) is disposed between the two pins 111 and is threaded through the brake plate 100 to engage the inner face of the brake shoe 110. It will be apparent that by adjusting the screw 115, the position of the shoe relative to the face of the plate 100 can be varied.

A lower brake shoe 120 is mounted in an identical manner to the lower portion of the brake plate by two slide pins 121 and an adjusting screw 122. The shoes have inclined faces for engagement with an inclined surface 123 (FIG. 7) of an annular flange of the pulley 93.

A cam ring 125 is mounted on a ball bearing unit 126 that is positioned in slidable engagement with shaft 90 between the spacer washers 97 and the brake plate 100. An actuator lever 130, which will be described presently, has end portions operatively engaged between the cam ring 125 and the plate. In one of its operation, the lever moves the plate 100 to the right (FIG. 7) to urge a cup 132 against a washer 133 to compress a pair of Belleville springs 134 that are disposed on shaft 90 between axially-fixed snap ring 135 and a sleeve 131. The sleeve 131 abuts a hub portion of a fan 131a secured to the end of shaft 90. It will be noted that the sleeve limits movement of the springs in one direction and the snap ring 135 acts as a stop in the other direction.

The actuator lever 130 (FIG. 7) has a lower arm 136 adapted to be manually actuated, and an upper end in the form of a yoke 137 having an inturned camming leg 138 (FIG. 9) at each of its ends. Each camming leg 138 is a flattened member of generally rectangular section. The cam ring 125 has two V-shaped recesses 140 in portions that are diametrically opposed; and one edge 138a (FIG. 7) of each camming leg 138 is disposed at the bottom or apex of an associated recess while the other edge 138b bears against the face 100a of the brake plate 100. The camming legs 138 move between the FIG. 7 position, in which the lever 130 has been swung counterclockwise and each leg 138 bears against a stop 142 in the form of a small leaf spring carried by the ring 125, and the FIG. 8 position in which the lever 130 has been swung clockwise to a generally vertical position with the lower surface of each leg 138 resting against a face of the associated recess 140.

To apply the brake, the lever 130 is pivoted from the FIG. 8 position to the FIG. 7 position. It will be noted that, during this movement, the space X between the cam ring 125 and the brake plate 100 is decreased. This decrease is permitted by the movement of the camming legs 138 toward inclined position since, when the legs move away from horizontal position, the large Belleville springs 134 move the brake shoes toward engagement with the inclined surfaces of the pulley. The snap ring 135 limits the expansion of the spring 134. As the legs 138 continue their movement toward the inclined position, the smaller Belleville springs 96 move the clutch ring 98 away from the clutch plate 91 and urges the pulley into gripping engagement with the brake shoes 110 and 120.

To apply the clutch, the lever 130 is pivoted to the FIG. 8 position in which the camming legs 138 are substantially horizontal and the distance X is a maximum. During this movement toward clutch-engaged position, the small Belleville springs 96 are first depressed, permitting the clutching members to move into engagement. Continued movement of the camming legs 38 toward their horizontal position moves the brake plate 100 toward the right to compress the large Belleville springs 134 and separate the brake shoes from the pulley.

In FIGS. 10–13 there is illustrated a modified arrangement of the clutch-brake of FIGS. 7–9. In this modification all of the parts are identical to the parts of the FIGS. 7–9 arrangement with the exception of the parts acted on by the actuating lever 130; and the identical parts will be given the same reference numerals they were assigned in FIGS. 7–9.

In this arrangement, the camming legs 138 act between a brake plate 150 and a cam ring 151. The cam ring has two diametrically opposed notches 153 (one only being illustrated), and the brake plate 150 has a projecting arm 155 directly opposite each notch 153. A pin 157, secured in the ring 151 directly above each notch 153, is in alignment with a socket 158 formed in the brake plate 150 above each projecting arm 155. The operation of the clutch-brake of FIGS 10–13 is identical to the operation of the clutch brake of FIGS. 7–9. In FIG. 10 the brake engaged position is shown. It will be noted that the camming legs 138 are in inclined position permitting the minimum distance X to be reached. The large Belleville springs 134 have moved the brake shoes 110 and 120 to the left and the smaller springs 96 have dis-engaged the clutch and moved the pulley 93 to the right into contact with the brake shoes.

Figure 12:
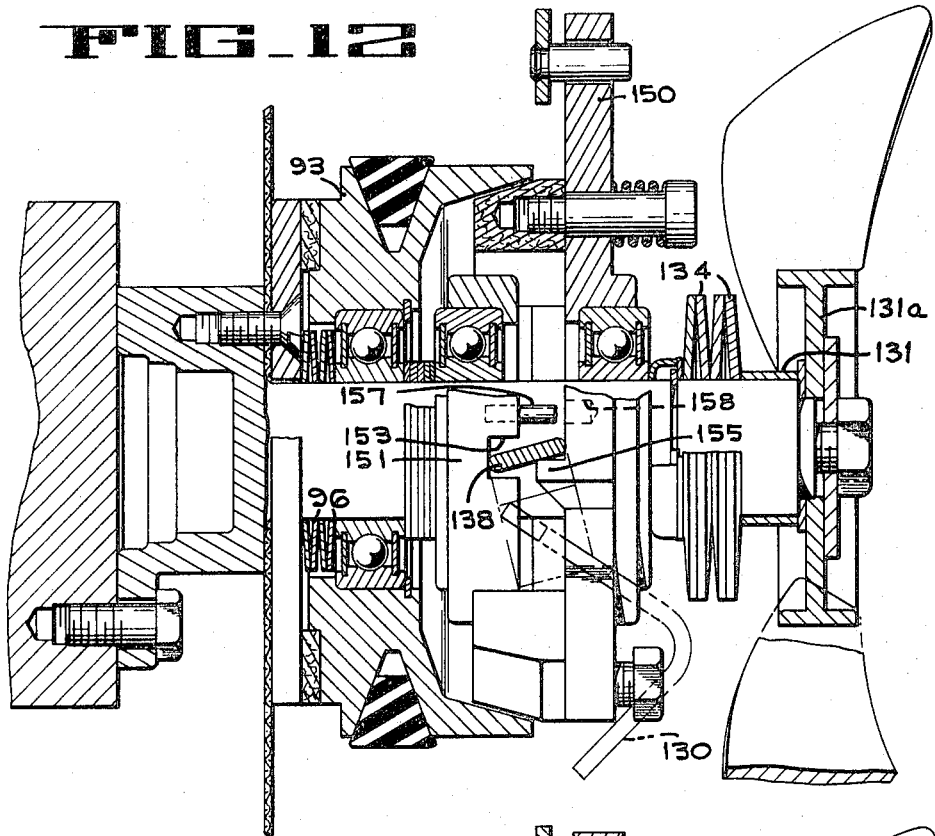
FIGS. 12 and 13 are sections similar to FIG. 10 but showing the parts in different operating positions.
Figure 13:
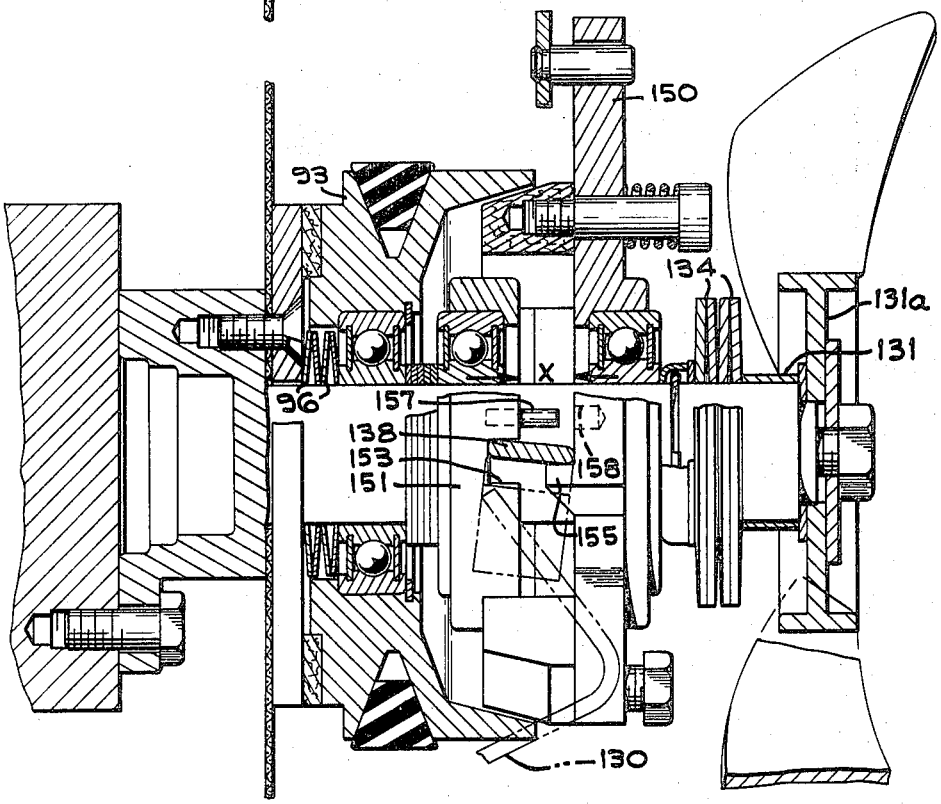

The movement of the mechanism form brake-applied position to clutch-engaged position is illustrated progressively in FIGS. 10, 12 and 13. It will be noted that, in the intermediate position of FIG. 12, the camming legs 138 have already compressed the small springs 96 and moved the clutch elements into engagement--but they have not begun to compress the large springs 134. In FIG. 13, the camming legs have reached a generally horizontal position and have forced the brake plate toward the right, compressing the large springs 134.

From the foregoing description it will be seen that the present invention provides an effective spring mechanism for maintaining a pressure on the clutch-actuating mechanism so that the clutch is engaged and held in engagement under substantially uniform pressure. The spring back-up mechanism also makes possible the movement of the clutch-actuating mechanism past clutch-engaged position. Further the adjustable cup arrangement of FIG. 4 makes possible the variation of the pressure of the Belleville spring 66. Also, the novel lever locking arrangements of FIGS. 7 and 12 provide effective mechanisms for moving the clutch elements into engagement and holding them there.

Having thus described the invention, what is claimed as new is:

1. In a clutch of the type having a drive member, a driven member, a shaft in driven relation with one of said members, two adjacent clutch elements surrounding the axis of said shaft respectively and connected in drive engagement with said members, one of said elements being mounted for movement in a direction axially of said shaft between an engaged position in gripping engagement with the other of said elements and a release position spaced from said other element, resilient means for urging said one clutch element away from said other element, an actuating mechanism movable along said shaft for applying a force to move said one element into engaged position with said other element against the resistance of said resilient means, spring means for applying a substantially uniform pressure against said actuating mechanism in a direction to cause said mechanism to apply said force to said one clutch element, the improvement which comprises transmission means operatively connected between said actuating means and said spring means for transmitting the pressure of said spring means to said actuating means, said transmission means being adjustable in a direction longitudinally of said shaft, adjustment in one direction being effective to lengthen said transmission means and adjustably move said actuating means and said one clutch element in a direction toward the engaged position of said clutch elements.

2. The mechanism of claim 1 including two fixed stops secured in spaced relation on said shaft, said spring means being a compression spring disposed around said shaft between said stops, and said transmission means being operatively disposed between said actuating mechanism and said spring for transmitting the pressure of said spring to said actuating means as said one clutch element is moved toward engaged position and for transmitting a force from said actuating means to said spring after said elements are in engagement.

3. The mechanism of claim 2 wherein said transmission mechanism includes an externally-threaded abutment member slidable on said shaft, and an internally-threaded cup rotatable on said shaft and threaded on said abutment member.

4. The mechanism of claim 2 wherein said transmission means includes a cup having a central portion slidable on said shaft and a peripheral portion enclosing one of said stops and bearing against said spring.

* * * * *